United States Patent [19]

Krupp

[11] 3,838,222

[45] Sept. 24, 1974

[54] PATHFINDING LOGIC FOR MULTISTAGE TIME DIVISION MULTIPLEX SWITCHING NETWORK

[75] Inventor: Roy Stephen Krupp, Rumson, N.J.

[73] Assignee: Bell Telephone Laboratories Incorporated, Murray Hill, N.J.

[22] Filed: Mar. 6, 1973

[21] Appl. No.: 338,567

[52] U.S. Cl. .......... 179/15 AQ
[51] Int. Cl. .......... H04j 3/00
[58] Field of Search ....... 179/15 AQ, 15 AT, 15 BY

[56] References Cited

UNITED STATES PATENTS 3,718,769 2/1973 Jacob .......... 179/18 J

*Primary Examiner*—Kathleen H. Claffy
*Assistant Examiner*—Joseph A. Popek
*Attorney, Agent, or Firm*—C. S. Phelan

[57] ABSTRACT

Pathfinding logic is described for a time division multiplex switching network of the type which includes alternate stages of time slot interchangers and mass series-parallel converters. Multiple network blocks are included in each stage of the network, and these blocks are cross-connected by grid networks at several different stages in order to provide complete access for each network input highway to any of the network output highways with a relatively low blocking probability. Logic circuits are provided for NORing time slot busy-bit signals of calling block output lines which correspond to called block input lines. The results of the NOR function comprise signals that identify a calling block output line number and time slot number which uniquely define an available time-space path between a calling highway and time slot and a called highway and time slot which are to be placed into communication with one another.

19 Claims, 6 Drawing Figures

PATHFINDING LOGIC FOR MULTISTAGE TIME DIVISION MULTIPLEX SWITCHING NETWORK

BACKGROUND OF THE INVENTION

1. Field of the Invention

This invention relates to pathfinding logic for a time division multiplex switching network; and the invention relates, in particular, to such networks which employ nonsymmetrically located sets of interblock line grid networks.

2. Description of the Prior Art

Time division multiplex switching networks which utilize alternate stages of time slot interchanger blocks and mass series-parallel converter blocks are taught in a copending application of R. S. Krupp and L. A. Tomko, Ser. No. 212,089, filed Dec. 27, 1971, now U.S. Pat. No. 3,740,480, and assigned to the same assignee as the present application. In that application it was pointed out that multistage networks can involve substantial central control processor time and memory dedication for performing the task of locating an unused path through the network for establishing a communication channel between a calling highway and time slot and a called highway and time slot. Logic circuits were also taught in that application for performing the pathfinding function with lower processor time requirements for a network employing three time slot interchanger stages and for networks of larger size but which are symmetrical in stage and grid network configuration with respect to a central, time slot interchanger stage. Additional pathfinding logic for three-stage networks was also taught in my copending application Ser. No. 212,348, filed Dec. 27, 1971, now U.S. Pat. No. 3,743,789, and assigned to the same assignee as the present application. However, when the configuration of grid network sets in larger time slot switching networks becomes nonsymmetrical, the pathfinding task becomes more complex and has heretofore required substantial additional processor time and memory dedication.

STATEMENT OF THE INVENTION

The foregoing network pathfinding problem is alleviated by the present invention which, in one illustrative embodiment, includes time slot availability comparison logic coupled to receive inputs from corresponding lines of network blocks which are identifiable with a calling highway and a called highway, respectively. This logic produces output signals which uniquely define an available time-space path between those highways which are to be placed into communication with one another.

It is one feature of the invention that the logic has input circuit sets which bracket the portion of the time division switching network which includes interblock line grid networks.

It is another feature that the logic input circuit sets are coupled to network calling and called portions, respectively, so that, for any given communication path, the line number and time slot number at the output of the calling block correspond to the time slot number and input line number, respectively, at the input to the called block.

A further feature is that coincidence logic responsive to time slot signals on a plurality of network, interstage interface, signal paths at at least one interstage interface, on a network calling path, and on a network called path produces an output which is indicative of an interface path time slot and line number defining an available signal path between the calling and called paths.

BRIEF DESCRIPTION OF THE DRAWING

A more complete understanding of the invention and the various features, objects, and advantages thereof may be obtained from a consideration of the following detailed description when taken together with the appended claims and the attached drawing in which:

DETAILED DESCRIPTION

Figures 1, 2:
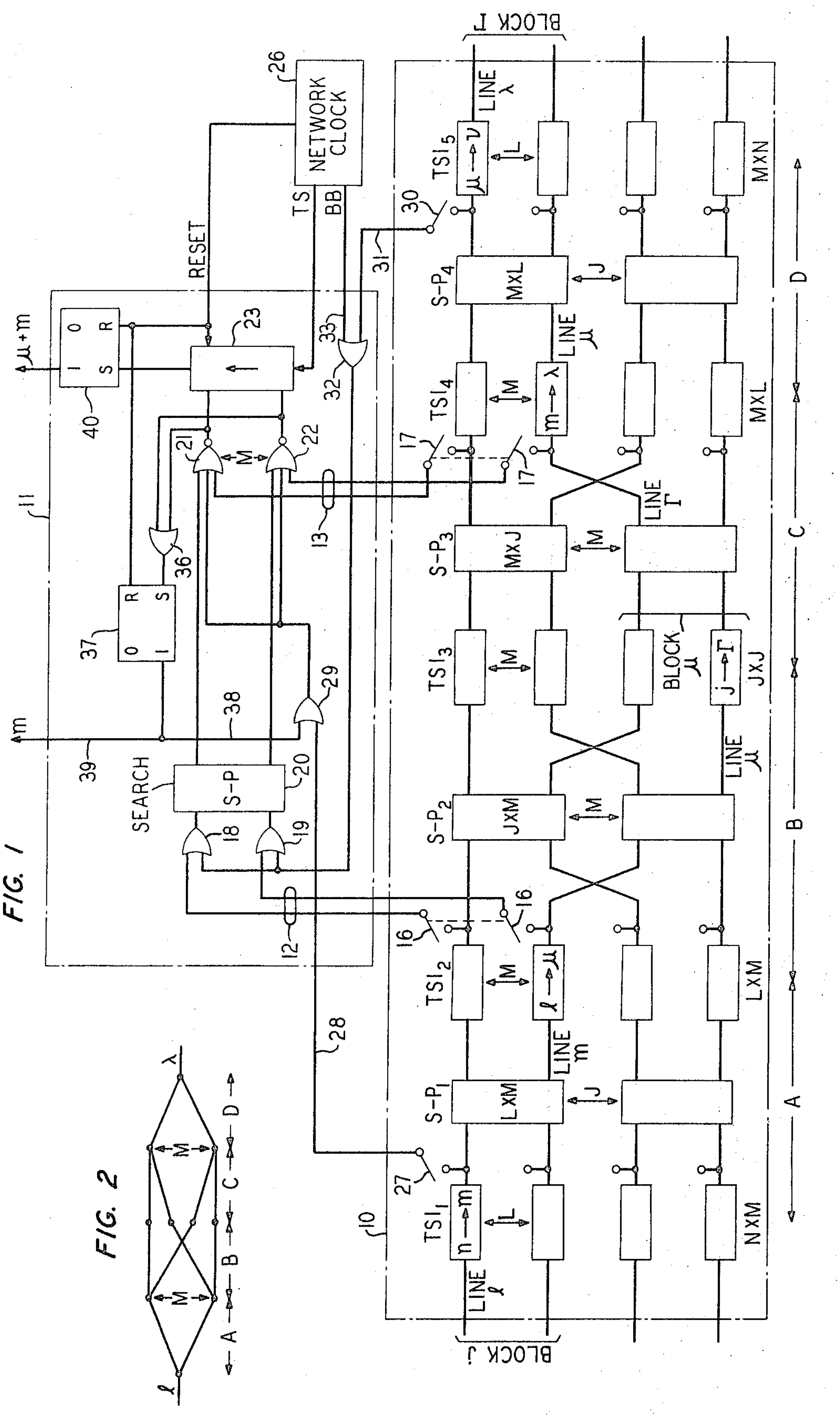
FIG. 1 is a simplified block and line diagram of a time division multiplex switching network utilizing the present invention.
FIG. 2 is a probability linear graph illustrating schematically communication path options between any pair of input and output highways of the network of FIG. 1.
Figure 4:
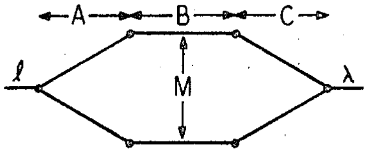

In FIG. 1 a time division multiplex switching network 10 is illustrated and is of the type shown in FIG. 4 of the aforementioned Krupp-Tomko application. The network is shown in the usual unfolded format wherein the calling, or talking, part of each highway is at the left in the drawing and the called, or listening, part is at the right. This network includes alternate stages of time slot interchangers and mass series-parallel converters. Although in a strict network sense only the interchangers perform switching, and the converters are part of the interstage links, it is convenient for purposes of description to refer to both interchanger and converter stages. Furthermore, connections between adjacent interchangers and converters are designated "lines" rather than "links" to distinguish the space-division concept wherein identification of a link completely fixes the interstage connection because it is not time shared.

The five time slot interchanger stages $TSI_1$ through $TSI_5$ each includes a plurality of time slot interchangers of any appropriate type. For example the time slot interchangers are advantageously of the type taught in the copending R. S. Krupp and L. A. Tomko application Ser. No. 204,143, filed Dec. 2, 1971, now U.S. Pat. No. 3,770,895, and assigned to the same assignee as the present application. Each time slot interchanger has the capability of interchanging a time slot signal from any time slot of an input time division multiplex signal frame to the same or any other time slot of an interchanger output signal frame. However, the numbers of time slots in the input and output signal frames need not necessarily be equal as taught in the aforementioned Krupp et al. application Ser. No. 204,143. In the illustrative embodiment of FIG. 1 herein, four of the five stages do operate with unequal numbers of input and output time slots per frame as indicated by the capitalized reference characters beneath each interchanger stage in FIG. 1. For example, the stage $TSI_1$ includes interchangers which operate with N time slots per input frame and M time slots per output frame wherein, for illustrative purposes, N equals 48 and M equals 60. Similarly, the interchangers in stage $TSI_2$ have L equal 48 time slots per input frame and M time slots per output frame. The central stage $TSI_3$ includes interchangers which operate with the same number J equal 48 time slots in both the input and the output frames. The time slot capabilities of the stages $TSI_4$ and $TSI_5$ are MxL and MxN, respectively, to complete a mirror image of the time slot capabilities of the two input interchanger stages for forming a time slot capability pattern for the entire network which is symmetrical about the center stage $TSI_3$. Such a network has a blocking probability of less than $10^{-10}$ for the indicated illustrative parameter values. That level of blocking makes it unlikely that attendant intervention would be required to shift distributing frame connections for rebalancing traffic.

Interposed between the time slot interchanger stages of the network are stages of mass series-parallel converters such as the four stages $S\text{-}P_1$ through $S\text{-}P_4$. Each of these converters performs a two-dimensional shift register type of function, wherein input line and time slot numbers to the converter are transposed into converter output time slot and line numbers, respectively. That is, time and space coordinates of received words are interchanged. This type of operation is considered in more detail in connection with one specific type of converter in the copending R. S. Krupp and L. A. Tomko application Ser. No. 212,005, filed Dec. 27, 1971, now U.S. Pat. No. 3,743,788, which is assigned to the same assignee as the present application. These converters are distributed on a basis of one converter for each block in each converter stage. Thus, each converter includes a number of input connections which is equal to the number of time slot interchangers in the same block of the immediately preceding interchanger stage, and it has a number of output connections equal to the number of interchangers in the same block of the immediately succeeding interchanger stage. However, in network locations where the converter receives inputs from different blocks, it includes a number of input connections which is equal to the number of blocks in the preceding interchanger stage. Similarly, the number of outputs of a converter which supply signals to different blocks of a succeeding interchanger stage is equal to the number of such blocks.

In FIG. 1, it is assumed for convenience of description that interchangers in a block, blocks in an interchanger or converter stage, line input ends in a block, and line output ends in a block are numbered in respective series that increase from top to bottom as illustrated in the drawing. Such numbering is not specifically shown in the drawing, but it is schematically indicated by English or Greek characters designating the highest number of the series as already noted for the values L, N, M, and J. In order to describe a general path through network 10, lower case English letters or corresponding Greek characters will be utilized to designate specific lines or blocks within a group which has a total number of units represented by a corresponding upper case English letter; and a similar usage will be employed for naming time slots in such a general path.

The interchangers of stage $TSI_1$ are grouped into J blocks of L interchangers each, only the first and last of the J blocks and L interchangers being shown. Thus, there are J converters, the first and last being shown, in converter stage $S\text{-}P_1$ and J blocks of interchangers similarly shown in stage $TSI_2$. Stages $TSI_5$, $S\text{-}P_4$, and $TSI_4$, respectively, are similarly configured in accordance with the aforementioned mirror image, or symmetrical, type of arrangement. Network 10 thus has a capacity $C = JLN$ terminations which can be served. A line grid network cross-connects blocks of stage $TSI_2$ with blocks of stage $S\text{-}P_2$ in accordance with a typical grid pattern wherein each interchanger output number of a block is connected to a correspondingly numbered block, or converter, of stage $S\text{-}P_2$ at an input to the latter stage which is numbered the same as the number of the block in interchanger stage $TSI_2$ at which the lines originate. A similar grid network is symmetrically located between stages $S\text{-}P_3$ and $TSI_4$, and another is nonsymmetrically located between stages $S\text{-}P_2$ and $TSI_3$. Before describing the comparison logic utilized in the present invention, a general time-space path through network 10 for any possible call connection will be described. It will then be shown how the invention facilitates the identification of specific path parameters needed to define a path that is available for use by a new call connection.

Thus, for a general time-space path, a calling block $j$ at the input side to network 10 in FIG. 1 will be herein considered to include a calling highway, or line, $l$ for providing signals in a time slot $n$ of the N time slots per frame on that highway. The corresponding interchanger $l$ in stage $TSI_1$ applies such time slot signals through a corresponding line $l$ to converter $j$ of stage $S\text{-}P_1$ in time slot $m$. That converter remaps the line and time slot numbers, as previously outlined, so that the same time slot signal will appear on converter output line $m$ in time slot $l$. In stage $TSI_2$ interchanger $m$ that time slot signal is transposed to time slot $\mu$. It will now be shown that the stage $TSI_2$ output line $m$ and time slot $\mu$ trace through the network to become the stage $TSI_4$ input line $\mu$ and time slot $m$.

The output of that stage $TSI_2$ interchanger $m$, which is illustratively the last interchanger of the uppermost block of interchangers in the stage, is coupled through a line in the grid network to the uppermost input connection of the last converter in stage $S\text{-}P_2$. Such line is numbered $m$ at stage $TSI_2$ and $j$ at the input to the converter $m$ in stage $S\text{-}P_2$. The routine operation of the latter converter causes the time slot signal to appear on converter output line $\mu$ (corresponding to converter input time slot $\mu$) in time slot $j$ (corresponding to the fact that the mentioned input line extends from the $j$th block of stage $TSI_2$).

Outputs from converters of stage $S\text{-}P_2$ are cross-coupled through another typical grid network to inputs of interchanger blocks in stage $TSI_3$. That is, each converter output is connected to a different one of the M interchanger blocks in stage $TSI_3$; and the number of the interchanger of that block corresponds to the number of the converter in stage $S\text{-}P_2$. Thus, the final output line $\mu$ (corresponding to stage $S\text{-}P_2$ input time slot $\mu$) of the converter $m$ extends to the final interchanger $m$ in the final interchanger block $\mu$ of stage $TSI_3$. In that block the time slot signal is transposed from the $j$th input time slot to output time slot $\Gamma$. Outputs in each block of interchanger stage $TSI_3$ are directly connected to corresponding inputs of corresponding respective blocks of converter stage $S\text{-}P_3$. Thus, still tracing the same time slot signal, it now appears on an output line $\Gamma$ (corresponding to the fact that it was received in time slot Γ), from a converter $\mu$ (corresponding to stage $TSI_3$ block $\mu$) of stage $S\text{-}P_3$ in time slot $m$ (corresponding to the fact that it originated on line $m$ at the input to stage $S\text{-}P_3$).

Converters of stage $S\text{-}P_3$ have their outputs connected through a grid network to interchangers of stage $TSI_4$ in a manner similar to that already indicated for the outputs of stage $S\text{-}P_2$. Thus, the time slot signal at the output of converter $\mu$ in stage $S\text{-}P_3$ is connected to the interchanger $\mu$ of block Γ of stage $TSI_4$ in time slot $m$. That is, the traced signal appears at the input to stage $TSI_4$ on line $\mu$ in time slot $m$. Its coordinates have thus been interchanged from the form line $m$ and time slot $\mu$ at stage $TSI_2$. In stage $TSI_4$ the time slot signal is transposed to time slot $\lambda$ on a line which is now designated $\mu$ indicating that the signal originated in block $\mu$ (converter $\mu$) of stage $S\text{-}P_3$. No further interblock cross-connections are provided in the network. Accordingly, the time slot signal is coupled through the converter in stage $S\text{-}P_4$ of the same block level Γ to appear at the output thereof on a line $\lambda$ in time slot $\mu$. That line couples the signal to the corresponding interchanger in stage $TSI_5$ wherein the signal is transposed from time slot $\mu$ to time slot $\nu$.

Although one general call connection has just been traced through network 10 of FIG. 1, many possible connection options through link sets A, B, C, and D are available in such a network; and these are conveniently illustrated in schematic form by a so-called Lee, or spider web, graph shown in FIG. 2. The use of such graphs is considered in greater detail in an article by C. Y. Lee, entitled "Analysis of Switching Networks," and appearing in the *Bell System Technical Journal*, Vol. 34, November 1955, pages 1285–1315. This graph presents the connection possibilities between any input link $l$, which is also considered to be the calling highway, and any one of the network output links $\lambda$, which is also the called highway. Nodes indicated by enlarged dots in the diagram of FIG. 2 represent time slot interchangers in FIG. 1. The sets of nodes are interconnected by sets of links A through D corresponding to time slots in intermediate lines and series-parallel converters, as indicated by corresponding reference characters A through D in FIG. 1. Thus, a signal on input link $l$ in FIG. 2 can be directed through any one of M links of the set A, only the first and last of which links are indicated, to any one of M interchanger inputs in stage $TSI_2$ by virtue of the cooperative operation of stages $TSI_1$ and $S\text{-}P_1$. Thus, the interchanger stage transposes the signal to a particular time slot corresponding to a stage $TSI_2$ interchanger in the same block level, and the converter of stage $S\text{-}P_1$ remaps that time slot signal to that interchanger as already described. Similarly, the links B in FIG. 2 represent the cooperative functioning of stage $TSI_2$ and stage $S\text{-}P_2$ for providing signals at the input of any interchanger in stage $TSI_2$ to a corresponding interchanger input in any block of interchanger stage $TSI_3$. Likewise, that interchanger and the corresponding converter of stage $S\text{-}P_3$ cooperate, as indicated by links C in FIG. 2, to couple the signal to any block of stage $TSI_4$. In the latter block the interchanger of stage $TSI_4$ and its converter of stage $S\text{-}P_4$ cooperate, as indicated by the links D in FIG. 2, to give the signal access to any output highway $\lambda$ of the block.

In spite of the apparent complexity of the generalized path definition through network 10 of FIG. 1, it has been discovered that the network does possess a characteristic which allows the determination of a single line number and a single time slot number at a signal path through an interstage interface for uniquely defining the entire path between calling highway and time slot and called highway and time slot. That characteristic is a similarity of time slot signal space and time coordinates at different network stages, or interstage interfaces, spanning a substantial portion of the network complexity. This fact, plus the nature of mass series-parallel converter operation and the known configurations of interstage line grid networks, enable the definition of a full network space-time path.

Given a particular space path through the network, the lines therein which include the time slot links of the FIG. 2 graph are sampled to determine the availability of those time slots. Then availability signal states for coordinated time slots, i.e., time slots in successive link stages that can be cooperatively employed for establishing a call connection, are compared in logic circuits; and both the logic circuit location and occurrence time of a match signal are determined to indicate time and space coordinates of a time slot at one of the mentioned network points of coordinate similarity. Comparison logic configuration depends to some extent upon the network configuration between the points of time slot coordinate similarity. However, certain aspects of the comparison logic are useful for similarly performing a path search in other networks even though network points of coordinate similarity are not present.

It will now be shown how the time slot coordinates at a network point of similarity are determined for a specific case and used to fix network line and time slot numbers of an entire available timespace path in terms of the network time base so that appropriate control signals can be placed in control memories which determine the manner of operation of the various time slot interchangers. The control memories and the manner of writing them are not herein considered since they are dealt with in considerable detail in the aforementioned copending applications Ser. Nos. 204,143 and 212,348, as well as a copending application Ser. No. 204,142, filed Dec. 2, 1971, now U.S. Pat. No. 3,743,788, of R. S. Krupp and L. A. Tomko and also assigned to the same assignee as the present application. It is observed, however, that there are no control memory functions associated with the mass series-parallel converters since they operate continuously in a fixed manner which does not require alterations when call connections are changed.

Path search logic 11 performs the necessary time division signal network monitoring functions for producing appropriate signals for utilization by a central control, not shown, to write the necessary control memories. Operation of the search logic 11 is based upon the utilization in the network 10 of a busy bit in each time slot signal for indicating whether or not that time slot is in use for a call connection. The busy-bit technique is considered in greater depth in my aforementioned application Ser. No. 212,348.

In general, the search logic 11 has two sets of input connections which receive signals from line sets of network 10 which are included at block levels of that network that are directly associated with the blocks which include the calling and called highways, respectively. Those line sets are characterized by the fact that the lines in the two sets which are utilized for a particular call connection have the same line-number-time-slot-number product magnitude. That is, line number and time slot number at the calling block are the same as time slot number and line number, respectively, at the called block. The basic effect produced by the search logic 11 in the illustrative embodiment is that of NOR-ing time slot signals which can be used for a single call connection at the two line sets to determine which lines and corresponding time slots are available for use on a new connection. The results of the NOR function are in the form of an electrical signal appearing on a particular NOR logic output lead and in a particular time slot which uniquely define an available network path that is useful for the desired call connection. Such signal is also placed into a form which makes it readily useful by a central control for establishing appropriate signals in the necessary time slot interchanger control memories.

A calling line, or highway, and time slot number and a called line, or highway, and time slot number for a connection which is to be established are provided in the telephone switching system in accordance with techniques which are now well known in the art, and particular forms of which will depend upon the type of system in which the invention is used. However, those numbers necessarily fix the calling block number, or block level, from the calling line through the stage $TSI_2$, and from the stage $TSI_4$ to the called line at the output edge of the network. From the foregoing description of a generalized call connection path through the network, it will be recalled that at the output of the calling block $j$ in stage $TSI_2$ the path is defined by a line number $m$ and a time slot number $\mu$. It is similarly noted that at the input to the called block $\Gamma$ to stage $TSI_4$ the path is defined in terms of an input line number $\mu$ and time slot number $m$. Accordingly, the calling block level output and called block level input have the same line-number-time-slot-number product of $m \times \mu$.

A set of switches 16 is operable to connect output lines of a selectable block of stage $TSI_2$ to corresponding leads in an input circuit set 12 of search logic 11. Although shown as mechanical switches, the switches 16 are advantageously considered schematically to represent electronic switches which are operable by control signals provided from the aforementioned central control. Those switches connect the circuits 12 to the stage $TSI_2$ outputs, i.e., signal paths of a first interstage interface in the tandem sequence of stages extending from left to right in FIG. 1, at the calling block level. A set of switches 17 is similarly provided for connecting a second set 13 of input connections for search logic 11 to receive signals from corresponding input lines of the interchangers at the called block level of stage $TSI_4$.

Within search logic 11 the first set 12 of input connections are coupled through OR gates, such as the two gates 18 and 19, respectively, to corresponding input connections of a search, mass, series-parallel converter 20. The OR gates produce a high, binary ONE, output if any input is high; and they produce a low, binary ZERO, output in response to a coincidence of low inputs. This converter 20 is of the same type as the converters already mentioned in the network 10. The respective output connections of converter 20 are coupled by way of individual NOR gates, such as the gates 21 and 22, to inputs of respective stages of an M-stage shift register 23. These NOR gates produce a high output signal in response to a coincidence of low inputs, and the output is low if any input is high. Because of the operation of converter 20, each NOR gate is responsive to signals in only one different time slot per frame in the output of stage $TSI_2$. The register 23 is operated in its shifting mode by shift clock signals received at the time slot rate for time division multiplex signals in the network 10. Those shift clock signals, and other timing signals utilized herein, are provided from a network clock circuit 26. The register 23 shifts signals contained therein upward in the orientation shown in FIG. 1, i.e., in a direction which is opposite to the direction of increase in numbering sequences for the input and output circuits of converter 20 and the associated OR and NOR gates already mentioned. Those numbering sequence directions correspond, of course, to the sequence direction utilized for numbering circuits within respective blocks in the network 10 as already discussed.

The second set 13 of input connections for search logic 11 extends to inputs of different ones of the NOR gates 21, 22. Thus, any one of those NOR gates is disabled if it receives a high input signal from a corresponding input line of the selected block in the stage $TSI_4$. Of particular interest, however, in connection with the operation of the logic 11 is the fact that no such disabling signal is provided when a binary ZERO signal is present in the busy-bit time of a time slot signal on a particular one of those input lines. Such a binary ZERO signal indicates that the time slot in which it appears is available for utilization in establishing new call connections. If it is assumed that a NOR gate number $\mu$ (corresponding to input line $\mu$ of stage $TSI_4$) is thus enabled in the busy-bit of a time slot $m$, and if it is further assumed that the same gate is also enabled in the same slot, i.e., time slot $m$, by an output of the search converter 20, then it is known (from the way converter 20 operates) that in the output of the calling block of stage $TSI_2$ the line number $m$ also has its time slot number $\mu$ available for use in a new call connection.

It is possible, however, that the time slot and line numbers thus indicated by coincident enablement of the NOR gate may not have correspondingly available time slot and link numbers on the calling and called highways. In order to be certain that such corresponding facilities are indeed available, additional inputs are provided for the search logic 11. To this end a switch 27 schematically represents a selectable connection of a circuit 28 to the output connection of a time slot interchanger being used by the called line $l$ in stage $TSI_1$. The circuit 28 extends to an input of an OR gate 29 which has its output connected in parallel to input connections of all of the NOR gates of the set including gates 21 and 22. Thus, any time a binary ONE signal appears in the output of the calling interchanger in stage $TSI_1$, all of those NOR gates are inhibited by the corresponding high signal. Consequently, during any busy-bit time when there is a binary ONE in the output of that calling interchanger, all of the NOR gates are disabled.

In similar fashion, a switch 30 schematically represents the selectable connection of a circuit 31 to the input line of the called time slot interchanger in stage $TSI_5$ of network 10. Circuit 31 is extended through an OR gate 32 which has its output applied in parallel to inputs of all of the OR gates, such as gates 18 and 19 in the input side of converter 20. OR gate 32 also receives from the network clock 26, by way of a lead 33, a signal which has a high, i.e., binary ONE, state at all times except during busy-bit intervals. Thus, signals on lead 33 cause all of the inputs to the search converter 20 to see high binary ONE signals at all times except during busy-bit intervals. If a busy bit at the input to the called interchanger in stage $TSI_5$ is in the high binary ONE condition, the input signal condition to converter 20 remains unchanged. More specifically, however, the result is to place a similar binary ONE inhibiting signal on the converter output connection corresponding to that time slot in every busy-bit time for a full frame interval thereafter. Thus, the only ones of the NOR gates 21, 22 which can be actuated in a busy-bit time are those which correspond to time slots at the input to the called interchanger in stage $TSI_5$ when the busy bit is in its binary ZERO state.

The combined effect of the inhibiting functions provided from circuits 31 and 28 is to prevent the NOR gates 21, 22 from being actuated by any busy-bit signal provided on circuit sets 12 and 13, unless that signal corresponds to the busy bit of an available time slot at the output of the calling interchanger in stage $TSI_1$ and the input of the called interchanger in stage $TSI_5$. However, when a NOR gate is actuated by a coincidence of low input signals at all of its inputs, the number of that NOR gate and the number of the time slot in which the gate output went high constitute the information which is necessary to define a complete call connection between calling and called lines and time slots.

The logic 11 advantageously includes additional circuits for placing the aforementioned path-defining information into a form which is more conveniently useful by a central control for writing interchanger control memories. For this purpose, the outputs of all of the NOR gates 21, 22 are coupled through an OR gate 36 for setting a bistable circuit 37 whenever the output of at least one of those NOR gates goes high. The resulting high signal at the binary ONE output of the circuit 37 is applied by way of a lead 38 to another input of the OR gate 29 for inhibiting all of NOR gates 21, 22 for as long as the bistable circuit 37 remains set. The same high binary ONE output signal is also applied on a circuit 39 which extends to the central processor where the initiation of that high signal identifies the magnitude of $m$ by any convenient means. For example, the leading edge of that high signal is advantageously employed to gate into a buffer register (not shown) a snapshot of the contents of an M-count counter (not shown) which is operated by the time slot clock in synchronism with the M-bit frame clock of the network 10.

Shift register 23 in the logic 11 operates to shift upward, as shown in the drawing, all high output indications received from the NOR gates 21, 22 at any one time. The indications thus provided from those gates come out of the register 23 at the upper end thereof after traversing any intervening shift register stages. However, since the register stages correspond to outputs of search converter 20, which correspond in turn to stage $TSI_2$ block output time slot numbers, the time delay (in numbers of time slots) between (a) the entry of any NOR gate output signal into register 23, and (b) the appearance of that signal at the output of register 23 is equal to the time slot number $\mu$ of the time slot on the output line in stage $TSI_2$ which provided one of the enabling signals for that NOR gate. The first shift register output after a NOR gate 21, 22 has been actuated is applied to set a bistable circuit 40 for indicating, by the leading edge of its high binary ONE output signal to the central control, a time which is equal to the sum of the magnitudes of $m$ and $\mu$. Since the maximum value of $\mu$ and the maximum value of $m$ are both M, the $\mu$ plus $m$ sum can also be employed to take another snapshot of the contents of the aforementioned M-count counter for giving the magnitude of $\mu$ plus $m$. It is a simple matter for the central control processor to subtract the $m$ snapshot magnitude from the $(\mu + m)$ snapshot magnitude to obtain the magnitude of $\mu$.

At the end of each time division signal frame, of the frame size on network 10 input and output highways, clock 26 supplies a reset signal to register 23 and to bistable circuits 37 and 40. This action clears those circuits for searching in a new frame period if the central control has not yet received the necessary $m$ and $(\mu + m)$ signals or if the central control is ready to start a search for a new call connection. Of course, if the central control has no further searching tasks, switches 16, 17, 27, and 30 are disengaged from network 10 connection so that spurious inputs are not provided to logic 11.

Now that $\mu$ and $m$ have been determined, e.g., for the interface at the input of stage $TSI_4$, a specific one of the links C in the graph of FIG. 2 is also identified; and an entire network path is indicated. It can also be shown in FIG. 1 that the remainder of the path for the desired call connection is necessarily defined by those values and the calling and called line and time slot numbers. As previously mentioned, $\mu$ and $m$ define the time slot and line numbers, respectively, at the output of the calling block in stage $TSI_2$ and the line and time slot numbers, respectively, at the input to the called block in stage $TSI_4$. The stage $TSI_2$ input time slot number must be the same as the calling line number at the edge of the network because of the way in which the mass series-parallel converter operates in stage $S\text{-}P_1$ as already described. The output time slot number of the calling interchanger in stage $TSI_1$ must likewise be the same as the stage $TSI_2$ line number $m$ in the calling block as just determined. At stage $TSI_4$ the output time slot number $\lambda$ and at stage $TSI_5$ the input time slot number $\mu$ are similarly fixed.

Since each interchanger in a block of stage $TSI_2$ has an output to only one converter block of stage $S\text{-}P_2$, the number $m$ for the interchanger of stage $TSI_2$ is also the number of the stage $S\text{-}P_2$ converter, and the input line number to that converter is the same as the stage $TSI_2$ block number $j$. Converter output line number and thus the stage $TSI_3$ block number, are both the number $\mu$ of the converter input time slot number; and the time slot interchanger number in that block is the same as the converter number $m$ in stage $S\text{-}P_2$. The input time slot number $j$ of that stage $TSI_3$ interchanger is the same as the calling block number at stage $TSI_2$; and the output time slot number $\Gamma$ and the converter number in stage $S\text{-}P_3$ are similarly fixed by determination of the values $m$ and $\mu$ at the input to stage $TSI_4$. Thus, the entire call connection path through network 10 is specifically defined by the determination of $m$ and $\mu$.

Figure 3:
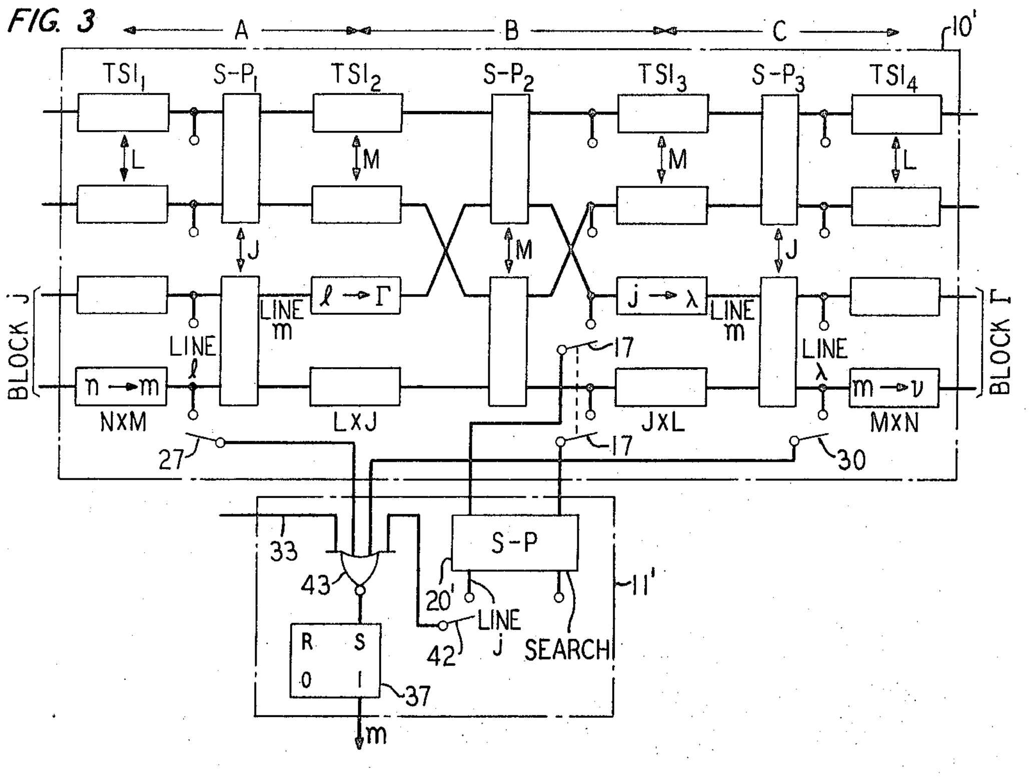
FIGS. 3 and 4 are a similar partial diagram and a graph, respectively, for another embodiment of the invention.
Figure 5:
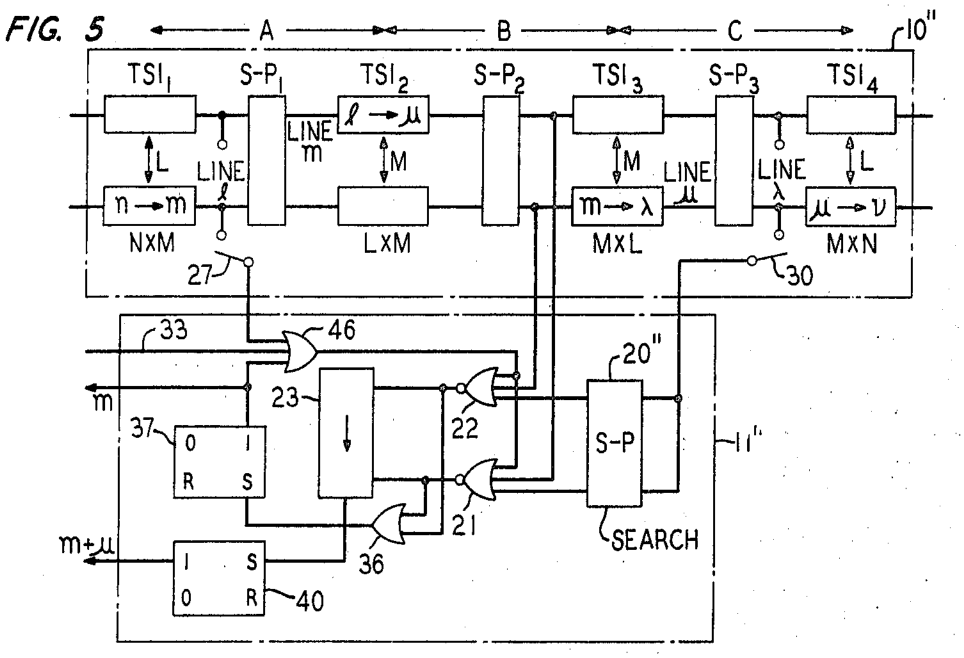

If the format of network 10 is modified, e.g., if block level cross-coupling connections are modified in location or configuration, the format of logic 11 may require corresponding change to reflect the change in network connection options. Examples of two different configurations for the network, and a correspondingly modified format for the path searh logic, are shown in FIGS. 3 and 5. In each of these figures, structures which are the same as, or similar to, corresponding structures in FIG. 1 are designated by correspondingly similar reference characters.

FIG. 3 is a partial block and line diagram of a four-stage switching network 10' with a capacity of C = JLN terminations, i.e., the same capacity as the network 10 in FIG. 1. A corresponding probability linear graph for the network 10' is illustrated in FIG. 4. Such a four-stage design would probably not be employed for a toll switching network since the blocks of LN terminations are coupled together by only M of the B-links; and the network is, therefore, susceptible to load imbalance. However, networks of that type do occur in local switches where imbalance is primarily due to the concentration stages. Path search apparatus in logic 11' test all three of the links A through B in each of the M possible paths for a given call connection. That apparatus produces a signal transition at a time which is identifiable as the value *m* corresponding to the line number, at a particular interface, of a usable path through the network.

A search series-parallel converter 20' receives as inputs, by way of switches 17, signals from the inputs of interchangers of stage $TSI_3$ in the called block level Γ of the network. Converter 20' arranges the busy bits in those signals in serial form before they are fed to a NOR gate 43. Since the stage $S\text{-}P_2$ converter input line number to be used in the call connection is the same as the calling block number, and since the input line *j* to that converter corresponds to the input time slot number *j* at the stage $TSI_3$, the search converter 20' output line *j* is selected by a switch 42 for coupling to an enabling input connection a NOR gate 43. That gate also has input connections from the calling line *l* by way of switch 27 and from the called line λ by way of the switch 30. In addition, NOR gate 43 receives a timing input on the circuit 33 which has a low binary ZERO signal during busy bit times and a high binary ONE at all other times. Thus, NOR gate 43 is activated by a coincidence of low inputs to produce a high output only in busy bit times when a line at the input to the called block in stage $TSI_3$ is free in time slot *j*, and corresponding time slots are free at the output of the calling interchanger in stage $TSI_1$ and the input to the called interchanger in stage $TSI_4$. Such activation occurs in time slot *m* and causes the bistable circuit 37 to be set for producing a high binary ONE output signal. That signal has a leading edge which occurs at a time that is identifiable by time slot number as previously outlined in connection with FIG. 1.

It is not necessary in the embodiment of FIG. 3 to provide additional apparatus for identifying a further parameter since the value of *j* has already been identified, as evidenced by the operation of switch 42 as previously outlined. These values of *m* and *j* fix line and time slot numbers in the stage $TSI_3$ input to the called block Γ. A specific link B in FIG. 4 is thus identified. The value value of *m* also fixes the converter number of stage $S\text{-}P_2$ and its input line and time slot numbers, thereby identifying the line and time slot numbers at the output at stage $TSI_2$ of the calling block *j*. Thus, the entire call connection path through network 10' has been determined.

Figure 6:
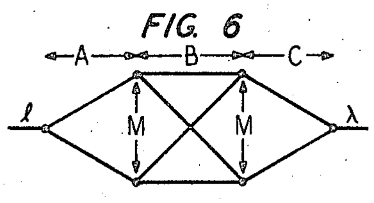
FIGS. 5 and 6 are a similar partial diagram and a graph, respectively, for a further embodiment of the invention.

FIG. 5 is a partial block and line diagram of a simpler four-stage network 10'' and the corresponding logic 11'' for that network. The probability linear graph for the network of FIG. 5 is shown in FIG. 6. Although the network of FIG. 5 is simpler than that of FIG. 3, has a lower termination capacity LN, and has a lower blocking probability, it requires search logic which is similar to that illustrated for the network of FIG. 1. Thus, a free time slot at the input to a called interchanger in stage $TSI_4$ produces a signal frame with binary ZERO busy bits on the converter 20'' output line corresponding to that time slot. The NOR gate of that converter output line is thus enabled and receives further enabling inputs both from its corresponding input from the stage $TSI_3$ and from the output of an OR gate 46. When the NOR gate is fully enabled it produces a high output signal which is entered into shift register 23 and which is also coupled through OR gate 36 to set bistable circuit 37.

Gate 46 provides a low output signal upon the coincidence of low inputs from timing lead 33 (low only at busy bit times), switch 27 (low at the busy bit time of a free time slot in the output of the calling interchanger of stage $TSI_1$), and the binary ONE output of bistable circuit 37 (low when 37 is in its reset state). The setting of bistable circuit 37 identifies the value of *m* as before and also provides a high signal through OR gate 46 to disable all of the NOR gates 21–22. Shift register 23 operates as previously outlined in connection with FIG. 1 to provide an output for setting bistable circuit 40 to identify the value $m + \mu$ as before. Thus, the time slot number *m* and the interchanger number μ are identified at the input to stage $TSI_3$. That is, a specific one of the links B in FIG. 6 is identified, and the whole call connection through the network 10'' is thereby defined as previously outlined in connection with FIG. 1.

Although the present invention has been described in connection with a particular embodiment thereof, it is to be understood that additional embodiments, modifications, and applications which will be obvious to those skilled in the art are included within the spirit and scope of the invention.

What is claimed is:

1. In a multistage time division multiplex switching network for communicating time slot signals in successive signal frames, a plurality of input lines including a calling path, a plurality of output lines including a called path, at least one network interstage interface including a plurality of signal paths, said interface paths including a path connectible by means of said network to said calling and called paths, means for producing a signal indication at an identifiable time in response to a coincidence of predetermined signal states at inputs thereof, said coincident states indicating, respectively, a free calling path time slot, a free called path time slot, and a free one of said interface paths, means for coupling signals from said calling path to at least one input of said producing means, means for coupling signals from said called path to at least one input of said producing means, and means for coupling signals from said interface paths to at least one input of said producing means.

2. The network in accordance with claim 1 in which said producing means comprises a coincidence gate, and
means responsive to coincident-signal actuation of said gate for producing a signal transition at the time of actuation of such gate,
said means for coupling calling path signals includes means for applying such signals to a first input of said gate,
said means for coupling interface path signals includes means for applying such signals to a second input of said gate in different time slots for each of said interface paths, and
said means for coupling calling path signals includes means for applying such signals to a third input of said gate.

3. The network in accordance with claim 1 in which said producing means comprises
a plurality of coincidence gates,
means responsive to coincident-signal actuation of one of said gates for producing a signal transition at the time of actuation thereof, and
means responsive to coincident-signal actuation of one of said gates for producing a signal transition at a time indicative of which one of said gates was actuated,
said means for coupling calling path signals includes means for applying such signals to an input of each of said gates,
said means for coupling interface path signals includes means for applying such signals to inputs of different ones of said gates, respectively, and
said means for coupling called path signals includes means for applying such signals to an input of a different one of said gates in each time slot of a frame.

4. The network in accordance with claim 3 in which said means for applying called path signals comprises
a mass series-parallel converter having a plurality of input connections and a plurality of output connections,
means for coupling each of said called path signals in multiple to all of said converter input connections, and
means for coupling each of said converter output connections to an input of a different one of said gates.

5. The network in accordance with claim 3 in which said interface signal applying means comprises
a mass series-parallel converter having plural input connections and plural output connections,
means for coupling said interface signals from said interface paths to said converter input connections, respectively, and
means for coupling said converter output connections to inputs of different ones of said gates, respectively, and
said means for applying called path signals includes means for coupling said called path signals in multiple to all of said converter input connections.

6. For a multistage time division multiplex switching network in which switching is accomplished by cascaded stages of time slot interchanging functions, a plurality of switching blocks are included at each stage, and interstage line grid networks cross-connect said blocks at predetermined stages,
means for identifying a time slot number and a line number at a predetermined network stage for defining an unused time-space path through at least a part of said network, and
means for coupling said identifying means across said part of said network, which part includes at least one of said grid networks, said coupling means comprising,
first means for connecting an input of said identifying means to receive signals on lines at the output of a selectable block including a calling input highway of said switching network, and
means for connecting said identifying means to receive signals from network lines at inputs of a selectable block including a called highway which is to be interconnected with said calling highway.

7. The switching network in accordance with claim 6 in which
an odd number of said interchanger stages are provided and an even number of mass series-parallel converter stages are interleaved with said interchanger stages, and
an odd number of said grid networks are provided in a stage location pattern that is nonsymmetrical with respect to a centrally located one of said interchanger stages.

8. The switching network in accordance with claim 6 in which said identifying means includes
a mass series-parallel converter,
means for connecting inputs of said converter to respective output lines of said calling block,
a plurality of gating means responsive to a coincidence of inputs of a predetermined signal state for producing a detectable output signal, said gating means each having input from a different output of said converter for enabling such gating means in response to an available time slot at an output of said calling block,
means for connecting each of said input lines of said called block to enable a different one of said gating means in response to an available time slot at a corresponding input of said called block, and
means for inhibiting said gating means in time intervals corresponding to busy time slots of said calling and called highways.

9. The switching network in accordance with claim 6 in which said identifying means includes
a mass series-parallel converter,
means for connecting inputs of said converter to respective output lines of said calling block,
a plurality of NOR gates each having an enabling input connected to a different output of said converter,
means for connecting each of said input lines of said called block to an enabling input of a different one of said NOR gates, and
means for inhibiting said NOR gates in time intervals corresponding to busy time slots of said calling and called highways.

10. The network in accordance with claim 9 in which said inhibiting means comprises
means for inhibiting all of said NOR gates during each calling highway time interval which includes a binary ONE signal, and means for coupling to all of said converter inputs in parallel a signal having a binary ZERO state during only those time intervals corresponding to busy-bit intervals of unused time slots on said called highway.

11. The network in accordance with claim 9 wherein said identifying means further comprises a shift register, means for coupling an output of each of said NOR gates to an input of a different stage of said shift register, means for operating said shift register at the time slot rate of time division signals in said network, and in a direction such that the final shift register stage, in the sequence of propagation, is the stage which receives the output from the one of said NOR gates which corresponds to the first occurring time slot of a frame in the time slot sequence of time division signal propagation, means for marking the occurrence time of a first output signal from said shift register so that such time corresponds to the summation of said line and time slot numbers at said predetermined stages, means for marking the occurrence time of a first output from one of said NOR gates to indicate, with respect to a network time base, a magnitude corresponding to said line number at the output of said calling block, and means for inhibiting said NOR gates for the duration of the last-mentioned marking signal.

12. For a multistage time division switching network having alterante stages of time slot interchangers and mass series-parallel converters and including multiple network blocks at each of said stages, which blocks are cross-connected at predetermined network stages, said network being adapted for the transmission of time division signals including a busy bit interval in periodically recurring time slot signal intervals, means for NORing time slot signals of corresponding lines of calling and called blocks of said network, which lines have the same line-number-time-slot-number product for any call connection utilizing such blocks, means for inhibiting said NORing means in busy-bit intervals of time slots on said calling highway for an existing call connection through said network, and means for inhibiting for a frame time interval any part of said NORing means corresponding to a called block line in the busy-bit time of each time slot of a frame including and following a busy time slot on a called highway for said call connection.

13. The method for identifying an available time-space signal path through a multistage time division multiplex switching network between a calling highway and a called highway, in which highways each time slot of a frame contains a busy bit signal indicating the use or nonuse of the time slot, and hich network includes plural switch blocks at each network stage and plural grid networks for cross-connecting those blocks at predetermined stages, said path being defined by time slot number and path number parameters of a path portion through said grid networks, said method comprising the steps of comparing corresponding busy bit signals from calling and called blocks at different networks stages, which stages enclose all of said grid networks, and which signals are for time slots that can be used in a call connection portion between said different stages, such comparison producing a match indication including both a time factor and a space factor that correspond to a time-space path between said different stages, inhibiting said comparing step in time slots which are occupied by existing call connections on either said calling highway or said called highway, and identifying, in response to said match indication, the time slot number of a signal match in the comparing step and the number of the grid network path between said different stages for which the match occurred.

14. The switching network in accordance with claim 1 in which a plurality of said interstage interfaces are included in the network, said producing means comprises a plurality of coincidence gates, said interface signal coupling means comprises a mass series-parallel converter having plural input connections and plural output connections, means for coupling said interface signals of a first one of said interfaces in the tandem sequence of stages of said network to said converter input connections, respectively, and means for coupling said converter output connections to inputs of different ones of said gates, respectively, means for coupling said interface signals of a second one of said interfaces in the tandem sequence of stages of said network to inputs of said coincidence gates, respectively, said means for coupling calling path signals includes means for applying such signals to inputs of said gates in parallel, and said means for coupling called path signals includes means for applying such signals to all inputs of said converter in parallel.

15. The switching network in accordance with claim 14 in which each stage of said network includes a plurality of switching blocks, and interstage line grid networks cross-connect said blocks between at least two of said stages, and said first and second interfaces are located, respectively, at the output of the last of said stages in said tandem sequence before said grid networks and at the input of the first of said stages after said grid networks in said tandem sequence.

16. The switching network in accordance with claim 1 in which each of said time slot signals includes a busy bit interval for a binary signal which indicates by the binary state thereof whether or not the time slot in which it is located is in use in a call connection through said network, and means, including said means for coupling calling, called, and interface path signals, are provided for inhibiting said producing means in response to a busy bit signal indicating a time slot in use as aforesaid.

17. The switching network in accordance with claim 1 in which each of said time slot signals includes a busy bit interval or a binary signal which indicates by the binary state thereof whether or not the time slot in which it is located is in use in a call connection through said network, and means are provided for enabling said producing means only during said busy bit intervals.

18. The switching network in accordance with claim 1 in which each stage of said network includes a plurality of switching blocks and there are provided interstage line grid circuits cross-connecting said blocks between the stages of adjacent predetermined pairs of said stages in said tandem sequence, said producing means comprises a coincidence gate, said interface signal coupling means comprises a mass series-parallel converter having plural input connections and plural output connections, means for coupling said interface signals from said interface paths to said converter input connections, respectively, and means for coupling a selectable one of said converter output connections to an input of said coincidence gate, said selectable output connection corresponding to a block of said network input lines including said calling path, said means for coupling said calling path signals includes means for applying such signals to another input of said gate, and said means for coupling said called path signals includes means for applying such signals to yet another input of said gate.

19. The switching network in accordance with claim 1 in which a plurality of coincidence gates are provided, said interface signal coupling means comprises means for applying signals of respective ones of said interface paths to inputs of different ones of said gates, respectively, said means for coupling said called path signals comprises a mass series-parallel converter having plural input connections and plural output connections, means for applying signals from said called path to all of said converter input connections simultaneously, and means for coupling said converter output connections to different ones of said gates, respectively, and said means for coupling said calling path signals comprises means for applying such signals to all of said gates simultaneously.

* * * * *

UNITED STATES PATENT OFFICE

CERTIFICATE OF CORRECTION

Patent No. 3,838,222 Dated September 24, 1974

Inventor(s) Roy S. Krupp

It is certified that error appears in the above-identified patent and that said Letters Patent are hereby corrected as shown below:

In the specification, Column 3, line 30, "3,743,788" should read --3,723,985--. Column 7, line 34, "to", second occurrence, should read --of--. Column 11, line 2, "searh" should read --search--; line 37, "a" should read --of--. Claim 2, Column 13, line 12, "calling" should read --called--. Claim 11, Column 15, line 23, "stages" should read --stage--. Claim 13, Column 15, line 58, "hich" should read --which--. Claim 17, Column 16, line 68, "or" should read --for--.

Signed and sealed this 3rd day of December 1974.

(SEAL)
Attest:

McCOY M. GIBSON JR.
Attesting Officer

C. MARSHALL DANN
Commissioner of Patents